(12) United States Patent
Saito

(10) Patent No.: US 10,914,222 B2
(45) Date of Patent: Feb. 9, 2021

(54) GAS SENSOR

(71) Applicant: DENSO CORPORATION, Kariya (JP)

(72) Inventor: Akira Saito, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/521,700

(22) Filed: Jul. 25, 2019

(65) Prior Publication Data

US 2020/0032693 A1 Jan. 30, 2020

(30) Foreign Application Priority Data

Jul. 27, 2018 (JP) ................................ 2018-141515

(51) Int. Cl.
| | | |
|---|---|---|
| *F01N 11/00* | (2006.01) | |
| *F01N 3/10* | (2006.01) | |
| *G01N 27/407* | (2006.01) | |
| *G01N 27/26* | (2006.01) | |

(52) U.S. Cl.
CPC .............. *F01N 11/007* (2013.01); *F01N 3/10* (2013.01); *G01N 27/26* (2013.01); *G01N 27/4076* (2013.01); *G01N 27/4077* (2013.01)

(58) Field of Classification Search
CPC .......... F01N 11/007; F01N 3/10; F01N 11/00; F01N 2560/02; G01N 27/4077; G01N 27/26; G01N 27/4076
USPC .......... 60/276; 204/421, 424, 428, 431, 435; 73/1.06, 23.31
See application file for complete search history.

(56) References Cited

U.S. PATENT DOCUMENTS

| | | | | |
|---|---|---|---|---|
| 3,190,826 | A * | 6/1965 | Fricke | G01N 27/301 204/435 |
| 10,480,385 | B2 * | 11/2019 | Okamoto | B01D 53/9431 |
| 2003/0062264 | A1 * | 4/2003 | Kitanoya | G01N 33/0054 204/424 |
| 2009/0211906 | A1 * | 8/2009 | Sugaya | G01N 33/0054 204/424 |
| 2013/0240354 | A1 * | 9/2013 | Saitou | C04B 37/001 204/424 |
| 2013/0306475 | A1 * | 11/2013 | Suzuki | G01N 27/4077 204/429 |
| 2015/0308976 | A1 * | 10/2015 | Hu | G01N 27/4076 204/424 |
| 2017/0219513 | A1 * | 8/2017 | Kayama | G01N 27/41 |

FOREIGN PATENT DOCUMENTS

| | | |
|---|---|---|
| JP | 2001-124726 | 5/2001 |
| JP | 09-236575 | 1/2012 |
| WO | 2014/162935 | 10/2014 |

* cited by examiner

*Primary Examiner* — Hoang M Nguyen

(74) *Attorney, Agent, or Firm* — Nixon & Vanderhye P.C.

(57) ABSTRACT

In a gas sensor having a gas sensor element, a solid electrolyte body has a cylindrical cup shape, one end of which is closed to form a bottom part, and the other end of which is open. The solid electrolyte body has oxygen ion conductivity. A reference electrode is arranged on an interior surface of the solid electrolyte body. An atmosphere is in contact with the reference electrode. The measurement electrode is arranged on an exterior surface of the solid electrode body. Exhaust gas as a detection target is in contact with the measurement electrode. At least one of the measurement electrode and the reference electrode contains thallium particles, within a range of 0.1 ppm and not more than 150 ppm.

7 Claims, 4 Drawing Sheets

GAS SENSOR

CROSS-REFERENCE TO RELATED APPLICATION

This application is related to and claims priority from Japanese Patent Application No. 2018-141515 filed on Jul. 27, 2018, the contents of which are hereby incorporated by reference.

TECHNICAL FIELD

The present disclosure relates to gas sensors

BACKGROUND

In general, a catalyst converter using purification catalyst is arranged an exhaust gas pipe connected to a gasoline engine as an internal combustion engine using a fuel mixture of petrol and air. Further, gas sensors are arranged between the catalyst converter i.e. arranged at an upstream side and a downstream side of the catalyst converter. The gas sensor arranged at the upstream side of the catalyst converter directly detects a concentration of oxygen contained in exhaust gas emitted from a petrol engine as an internal combustion engine. This detection allows an engine controller to perform a feedback control and to adjust the behavior of the petrol engine.

On the other hand, the gas sensor arranged at the downstream side of the catalyst converter detects a concentration of oxygen in exhaust gas emitted from the catalyst converter so as to adjust the control based on the detection result of the gas sensor arranged at the upstream side. Further, deterioration diagnosis of the catalyst converter is performed on the basis of the detection result of the gas sensor arranged at the downstream side of the catalyst converter. An oxygen sensor is widely known and commonly used as this type of the gas sensor previously described. Such an oxygen sensor is composed of a gas sensor element and a ceramic heater. The gas sensor element has a solid electrolyte body of a cylindrical cup shape. Platinum electrodes are formed on the interior surface and an exterior surface of the solid electrolyte body. A porous protection layer is formed on the platinum electrode formed on the exterior surface of the solid electrolyte body. The ceramic heater is inserted in the inside of the gas sensor element.

The oxygen sensor detects whether an amount of gasoline contained in a fuel mixture is rich or lean relative to the theoretical air/fuel ratio (Stoichiometric) on the basis of an electromotive force generated by a difference in oxygen concentration between exhaust gas and the atmosphere. The electromotive force drastically varies around the theoretical air/fuel ratio.

SUMMARY

It is desired for the present disclosure to provide a gas sensor having a gas sensor element. The gas sensor element has a solid electrolyte body having a cylindrical cup shape, a reference electrode and a measurement electrode. The solid electrolyte body has oxygen ion conductivity, one end of which is closed to form a bottom part, and the other end of which is open. The reference electrode is arranged on an interior surface of the solid electrolyte body.

The reference electrode is in contact with atmospheric air. The measurement electrode is arranged on an exterior surface of the solid electrode body. The measurement electrode is in contact with exhaust gas as a detection target. At least one of the measurement electrode and the reference electrode contains thallium particles.

BRIEF DESCRIPTION OF THE DRAWINGS

A preferred, non-limiting embodiment of the present disclosure will be described by way of example with reference to the accompanying drawings, in which.

DETAILED DESCRIPTION OF THE PREFERRED EMBODIMENTS

Figure 1:
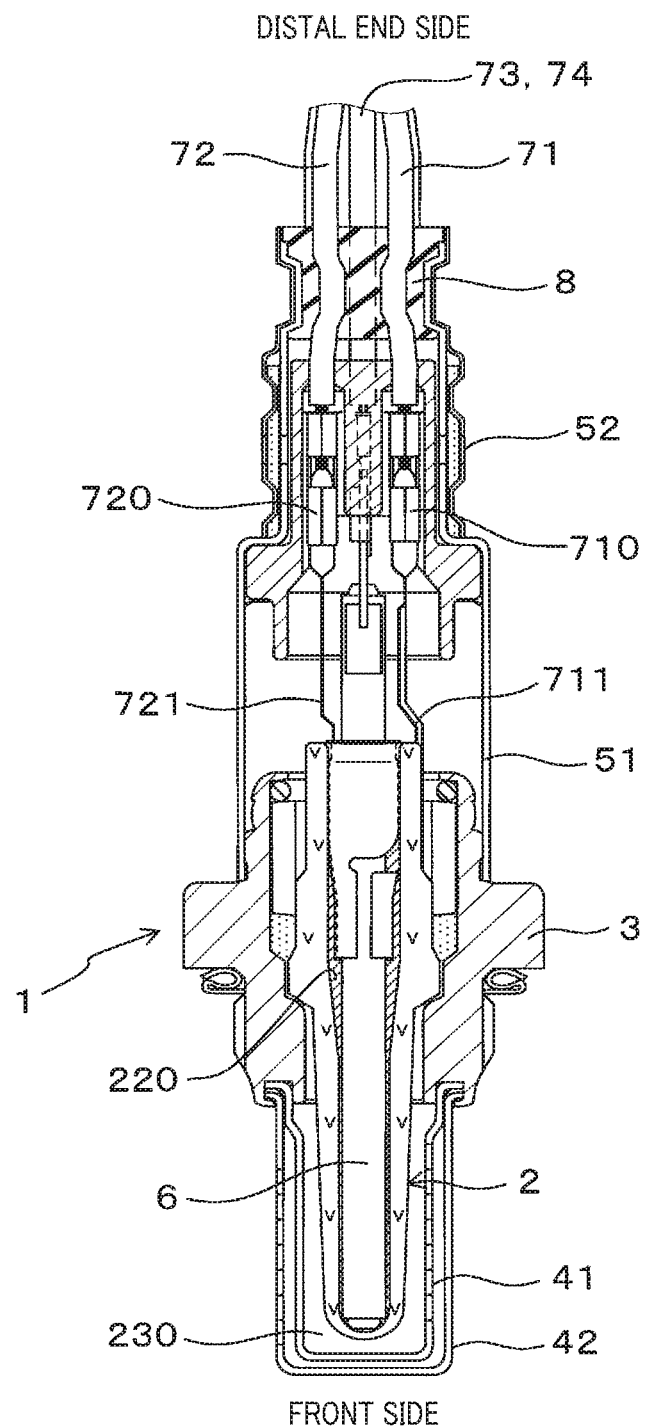
FIG. 1 is a view showing a cross section of a gas sensor according to a first exemplary embodiment of the present disclosure.

Hereinafter, various embodiments of the present disclosure will be described with reference to the accompanying drawings. In the following description of the various embodiments, like reference characters or numerals designate like or equivalent component parts throughout the several diagrams.

First Exemplary Embodiment

A description will be given of a gas sensor according to a first exemplary embodiment of the present disclosure with reference to FIG. 1 to FIG. 3.

FIG. 1 is a view showing a cross section of the gas sensor 1 according to the first exemplary embodiment of the present disclosure. As shown in FIG. 1, the gas sensor 1 according to the first exemplary embodiment has a gas sensor element 2. The gas sensor element 2 is composed of a solid electrolyte body 21, a reference electrode 22 and a measurement electrode 23.

A description will now be given of a structure of the gas sensor element 2 in detail.

In the structure of the gas sensor element 2, the solid electrolyte body 21 has a cylindrical cup shape having a bottom part. That is, one end part of the solid electrolyte body 21 is closed to form a bottom part. The other end part of the solid electrolyte body is open. The solid electrolyte body 21 has oxygen ion conductivity. Specifically, the solid electrolyte body 21 is made of partially stabilized zirconia or stabilized zirconia, etc. For example, it is possible to dope yttria ($Y_2O_3$), calcia (CaO), gadria ($Gd_2O_3$), etc. into zirconia.

For example, it is preferable to use yttria partially stabilized zirconia which contains 4 to 7% mol % of yttria as the solid electrolyte body 21 in view of oxygen ion conductivity, element strength, and manufacturing cost, etc.

Air, introduced into the inside of the gas sensor 1, comes into contact with the reference electrode 22. The reference electrode 22 is arranged on an interior surface of the solid electrolyte body 21. On the other hand, exhaust gas, emitted from an internal combustion engine (not shown) and introduced into the inside of the gas sensor 1, comes into contact with the measurement electrode 23. The measurement electrode 23 is arranged on the exterior surface of the solid electrolyte body 21.

Figure 2A:
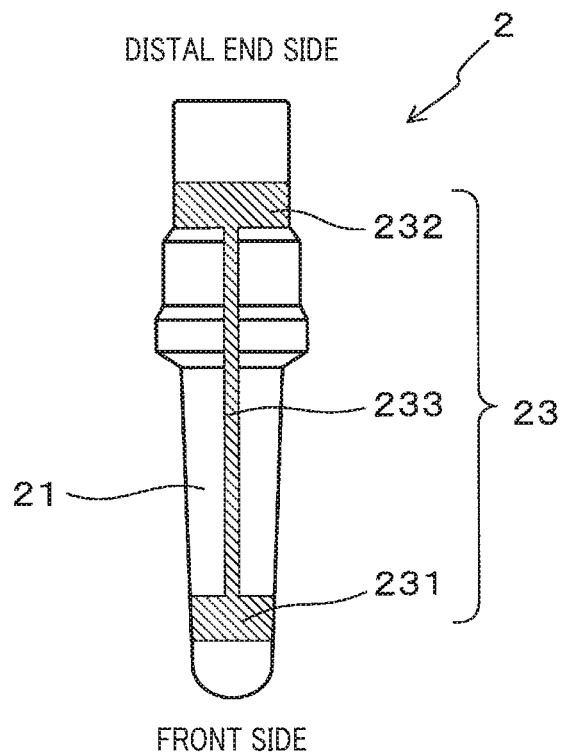
FIG. 2A is an external view of a gas sensor element arranged in the gas sensor according to the first exemplary embodiment shown in FIG. 1.
Figure 2B:
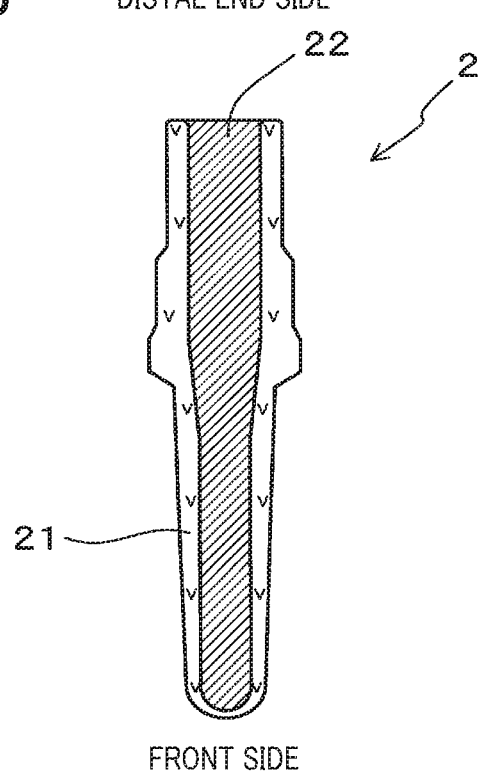
FIG. 2B is a view showing a cross section of the gas sensor element shown in FIG. 2A.

FIG. 2A is an external view of the gas sensor element 2 arranged in the gas sensor 1 according to the first exemplary embodiment shown in FIG. 1. FIG. 2B is a view showing a cross section of the gas sensor element 2 shown in FIG. 2A.

As shown in FIG. 2B, the reference electrode 22 is formed on the overall interior surface of the solid electrolyte body 21. As shown in FIG. 2A, the measurement electrode 23 is composed of an electrode part 231, an electrode terminal part 232 and an electrode lead part 233.

The electrode part 231 has a ring shape formed on a front part of the exterior surface along the whole circumference of the solid electrolyte body 21. The electrode terminal part 232 also has a ring shape formed on a distal end part of the exterior surface along the whole circumference of the solid electrolyte body 21.

The electrode lead part 233 is formed on the exterior surface of the solid electrolyte body 21, through which the electrode part 231 is electrically connected to the electrode terminal part 232.

In the structure of the gas sensor element 2 in the gas sensor 1 according to the first exemplary embodiment, at least the measurement electrode 23 contains thallium (TI). The presence of thallium makes it possible to reduce adsorb energy of rich gas, and to increase adsorb sites of lean gas simultaneously.

The presence of thallium (TI) improves the performance of the measurement electrode 23 which is in contact with introduced exhaust gas. That is, it is possible for the reference electrode 22 to contain no thallium as long as the measurement electrode 23 contains thallium. In view of communalization of electrode materials and simplification of performing electrode formation process, it is acceptable for both the reference electrode 22 and the measurement electrode 23 to contain thallium.

Specifically, at least the measurement electrode 23 is made of platinum (Pt) and thallium. This structure makes it possible to provide the gas sensor 1 having a superior thermal resistance, a superior catalytic reaction with exhaust gas and a superior responsivity to a small amount of NOx contained in exhaust gas.

For example, it is possible to form the reference electrode 22 by using platinum and thallium, or platinum without thallium. Because platinum has flexibility to form an electrode, it is possible to form an electrode made of metal plated with platinum.

It is possible to form the electrode which contains one of a thallium alloy, and thallium oxide. This structure makes it possible to dope thallium into the electrode, and to provide the electrode having a quick responsiveness to a small amount of NOx contained in exhaust gas as a detection target gas.

It is preferable to dope thallium alloy into the electrode. There is a platinum thallium alloy as thallium alloy in view of a responsiveness to a small amount of NOx, and catalyst reaction capability with exhaust gas. It is also acceptable for an electrode to partially contain thallium metal. This structure makes it also possible for the electrode to have the same effects and behavior previously described.

Figure 3:
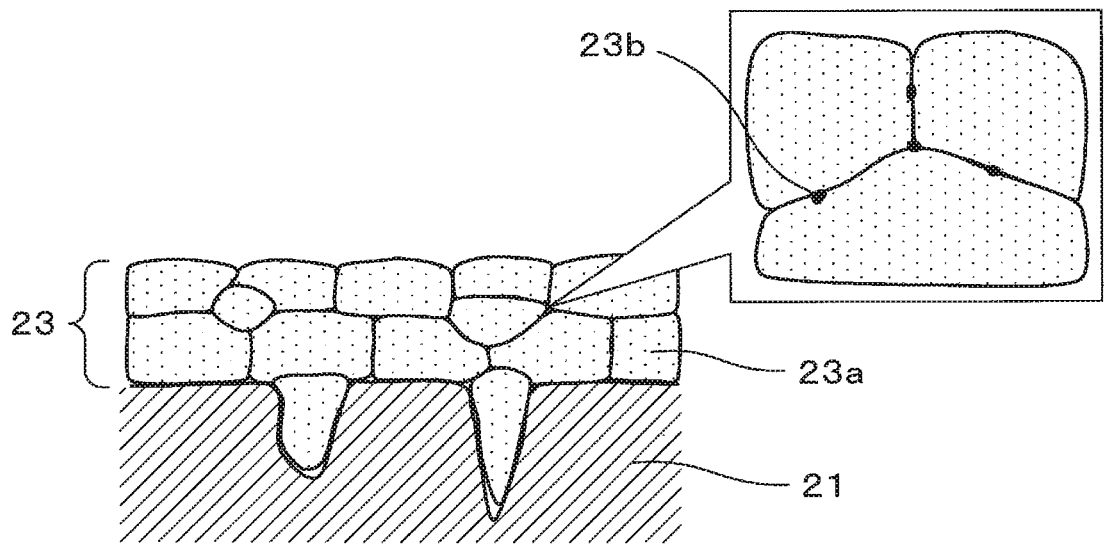
FIG. 3 is a schematic view showing a detailed structure of a measurement electrode in the gas sensor element arranged in the gas sensor according to the first exemplary embodiment shown in FIG. 1.

FIG. 3 is a schematic view showing a detailed structure of the measurement electrode 23 in the gas sensor element 2 arranged in the gas sensor 1 according to the first exemplary embodiment shown in FIG. 1.

It is possible to dope particles of thallium alloy and thallium oxide into an electrode. In the measurement electrode 23, shown in FIG. 3, reference character 23a represents platinum particles, and reference character 23b represents thallium alloy particles or thallium oxide particles.

It is acceptable for both the measurement electrode 23 and the reference electrode 22 to contain a same amount or a different amount of thallium, i.e. thallium alloy particles or thallium oxide particles.

It is possible for the electrode to contain thallium, i.e. thallium particles within a range of not less than 0.1 ppm and not more than 150 ppm. This electrode structure makes it possible to have an adsorbent part adsorbing a rich gas in a rich atmosphere, to provide the increased responsiveness to a small amount of NOx contained in exhaust gas while maintaining a necessary-level output of the gas sensor 1.

That is, the content of thallium previously described indicates a content of thallium, i.e. thallium particles in the measurement electrode 23 and/or the reference electrode 22.

In view of improvement of the responsiveness, i.e. a response speed of the electrode to a small amount of NOx contained in exhaust gas, it is preferable for the measurement electrode 23 and/or the reference electrode 22 to contain thallium, i.e. thallium particles within a range of not less than 1 ppm, more preferably within a range of not less than 3 ppm, further preferable within a range of not less than 5 ppm, and most preferable within a range of not less than 10 ppm.

Further, in view of maintain of a sensor output of the gas sensor 1 in a rich atmosphere, it is preferable for the measurement electrode 23 and/or the reference electrode 22 to contain thallium, i.e. thallium particles, within a range of not more than 140 ppm, more preferably within a range of not more than 120 ppm, further preferable within a range of not more than 110 ppm, and most preferable within a range of not more than 100 ppm.

It is acceptable for each of the measurement electrode 23 and the reference electrode 22 to contain the same amount of thallium or a different amount of thallium when both the measurement electrode 23 and the reference electrode 22 contain thallium.

An experiment was performed to detect a content of thallium in the electrode, i.e. the first exemplary embodiment performed a quantitative analysis of thallium contained in the electrode in the gas sensor element 2 of the gas sensor 1.

The experiment used at least ten test samples as the gas sensor element 2 having a different content of thallium. The test samples were immersed into hot aqua regia (i.e. hot royal water) at a temperature of 40° C. until a time when the electrode was completely dissolved in the hot aqua regia by visual inspection. The quantitative analysis of the obtained solution of hot aqua regia was performed by ICP-MS so as to detect a content of thallium in the electrode. This quantitative analysis was performed based on an internal standard method using a calibration curve.

When the gas sensor element 2 has a protection layer (not shown), the electrode is immersed into hot aqua regia until a time when the protection layer is completely stripped from the electrode.

It is acceptable to vibrate the electrode immersed into hot aqua regia so as to strip the protection layer from the electrode. In this case, it is necessary to detect the stripped protection layer by visual inspection until a time when a part of the electrode adhered to the stripped protection layer is completely dissolved in the hot aqua regia.

For example, there are an electroless plating method, an electro plating method, a spattering method, a pad printing method using electrode paste as the electrode formation method using thallium, i.e. thallium particles. It is preferable to use an electroless plating method in view of obtaining a uniform diffusion of thallium particles in the electrode and of improving material yield. In the electroless plating method, a water-soluble thallium salt is dissolved in an electroless plating solution such as an electroless platinum plating solution. After this, plating and thallium are deposited simultaneously, and the heat treatment of the obtained deposition is performed so as to form an electrode.

It is possible to change a state of thallium particles in an electrode by changing thermal processing conditions. For example, the thermal process is performed at a temperature within a range of 1000° C. to 1200° C. under a reducing atmosphere so as to form an alloy of thallium and a catalyst metal such as platinum which forms an electrode.

The thermal treatment in an oxygen atmosphere can generate thallium oxide. Because thallium oxide generated by the thermal treatment is volatilized from the surface of the electrode, it is possible to adjust an addition amount of water-soluble thallium salt added into the electroless plating solution.

In the gas sensor 1 according to the first exemplary embodiment, it is possible to form the measurement electrode 23 which is covered with a protection layer (not shown). It is possible to use a protection layer of a porous structure because the protection layer protects the protection layer from sulfur (S), phosphorus (P), glassy poisoning substances, etc. from the electrode, and adjusts an amount of exhaust gas to the electrode.

It is possible to adjust a type of, a porosity of, a thickness of the protection layer according to demands. It is possible to form the protection layer having a multiple layer structure.

It is possible to use alumina ($Al_2O_3$), alumina magnesium spinel ($MgAl_2O_4$), or titanium ($TiO_2$) to form the protection layer. In order to adjust a sintering state of the protection layer, it is possible for the protection layer to contain a small amount of alkaline metal oxide ($Li_2O$, $Na_2O$, $K_2O$, etc.), alkaline earth metal oxide (MgO, CaO, BaO, etc.), rare earth oxide ($Y_2O_3$, $La_2O_3$, etc.), and silica ($SiO_2$).

The gas sensor 1 according to the first exemplary embodiment shown in FIG. 1 has a gas sensor housing 3. The gas sensor element 2 is fixed and sealed to the gas sensor housing 3. Dual covers 41 and 42 are arranged at the front end side of the gas sensor housing 3. The front end part of the gas sensor element 2 are covered with the dual covers 41 and 42 so as to protect the front end part of the gas sensor element 2. An interior gap of the dual covers 41 and 42 forms an exhaust gas chamber 230. Dual atmosphere covers 51 and 52 are arranged at the distal end side of the gas sensor housing 3.

An interior gap of the gas sensor element 2 forms a reference gas chamber 220. A rod-shaped heater 6 is inserted into the reference chamber 220. A heating element is arranged in the rod-shaped heater 6. A front end part of the rod-shaped heater 6 is arranged and in contact with the interior surface of the solid electrolyte body 21 while maintaining a necessary clearance dimension.

An elastic insulation member 8 is arranged at the distal end side of the dual atmosphere covers 51 and 52. Lead wires 71, 72, 73 and 74 are inserted in the elastic insulation member 8.

An external power source (not shown) supplies a necessary voltage to the gas sensor element 2 through the lead wires 71 and 72, and output signals as detection results of the gas sensor element 2 are transmitted to an external device (not shown) through the lead wires. Electric power is supplied to the rod-shaped heater 6 through the lead wires 73 and 74 so as for the heating element in the rod-shaped heater 6 to generate thermal energy.

Front end parts of the lead wires 71 and 72 are connected to respective connection terminals 710 and 720. The connection terminals 710 and 720 are electrically in contact with respective terminals 711 and 721 fixed to the gas sensor element 2. The terminal 711 is in contact with and fixed to an electrode terminal 232 of the measurement electrode 23. The terminal 721 is in contact with and fixed to the reference electrode 22.

In the structure of the gas sensor element 2 of the gas sensor 1 according to the first exemplary embodiment, the measurement electrode 23 contains thallium, i.e. thallium particles. This improved structure makes it possible to reduce rich gas adsorbing energy, and to reduce an amount of rich gas adsorbed on the measurement electrode 23 when compared with that of an electrode without containing any thallium.

In the gas sensor 1 according to the first exemplary embodiment, a lean gas can be adsorbed on the surface of the measurement electrode 23 when a small amount of NOx contained in exhaust gas has reached the measurement electrode 23. Further, such a rich gas is oxidized and rapidly separated from the measurement electrode 23 by an electrode catalyst reaction. Accordingly, it is possible for first exemplary embodiment to provide the gas sensor 1 having a superior response speed to a small amount of NOx contained in exhaust gas as a detection target.

It is preferable to arrange the gas sensor 1 according to the first exemplary embodiment at a location of a downstream side of the catalyst converter mounted on an exhaust gas system (not shown) for an internal combustion engine (not shown).

The gas sensor 1 according to the first exemplary embodiment makes it possible to detect a small amount of NOx contained in exhaust gas with a high sensitivity. The use of the gas sensor 1 according to the first exemplary embodiment allows a controller (not shown) to perform a precise control of the internal combustion engine so as to operate the catalyst converter with high effectively. This makes it possible to further reduce the NOx emission of the internal combustion engine (not shown).

A description will be given of a method of manufacturing the gas sensor element according to a second exemplary embodiment of the present disclosure.

The same components between the first exemplary embodiment and the second exemplary embodiment will be referred with the same reference numbers and characters.

In the manufacture of the gas sensor 1 according to the first exemplary embodiment, the solid electrolyte body 21 is produced. That is, zirconia powder containing yttria of a predetermined amount is molded to form a molded body having a bottom. The molded body is fired at a temperature within a range of 1400° C. to 1600° C. so as to produce the solid electrolyte body 21.

A paste is applied on the exterior surface of the solid electrolyte body 21 by the pad printing method so as to have the shape of the measurement electrode 23 shown in FIG. 2.

On the other hand, a solution containing organic platinum compound is inserted into the inside of the solid electrolyte body 21 having a cup shape having a bottom by using a syringe. After an elapse of a predetermined time, the solution in the solid electrolyte body 21 having a cup shape is discarded outside. After this process, the solid electrolyte body 21 is fired at a temperature of 400° C. for one hour so as to decompose organic materials in the solid electrolyte body 21. This process produces a platinum core part from which the electroless platinum plating is grown.

Next, a platinum plating is grown from the platinum core part formed on the interior surface of the solid electrolyte body 21 by using an electroless platinum plating solution containing thallium and a reducing agent. After this process, the obtained solid electrolyte body 21 is fired at a temperature of 1200° C. for one hour. This process makes it possible to form the measurement electrode 23 and the reference electrode 22. The measurement electrode 23 has the platinum plated layer containing thallium.

For example, it is possible to use platinum amine complex salt, platinum nitro complex salt, etc. as platinum raw material dissolved in an electroless platinum plating solution.

It is also possible to use ethylene diamine, ethylene amine, etc. as a complex agent dissolved in an electroless platinum plating solution.

Further, it is possible to use, as thallium raw material dissolved in an electroless platinum plating solution, various kinds of thallium compounds as long as they do not reduce the deposition efficiency of platinum and do not reduce the deposition efficiency of thallium due to the presence of a complex agent and a stabilizer dissolved in the electroless platinum plating solution. For example, there are thallium salt, acetates, organic salts, etc. as thallium compounds. It is also acceptable to use one or more kinds of such thallium compounds.

It is possible to adjust a content of thallium. i.e. thallium particles in an electrode on the basis of a content of thallium raw material to be added into an electroless platinum plating solution in view of the deposition efficiency of thallium during a plating process and an evaporation amount of thallium in a thermal treatment process. It is possible to use hydrazine, sodium borohydride, etc. as a reducing agent.

In the formation of the protection layer on the surface of the measurement electrode 23, magnesia spinel raw material powder is sprayed on the surface of the electrode by a plasma spraying method. This plasma spraying forms a relatively dense film as a first protection layer on the surface of the electrode. It is possible for the first protection layer to protect the measurement electrode 23 from exhaust gas of a high temperature.

Next, in order to form a second protection layer on the first protection layer of the measurement electrode 23, the gas sensor element 2 having the measurement electrode 23 is immersed into a slurry containing alumina particles, and heated at a temperature within a range of 500° C. to 1000° C. These processes produce the second protection layer having a porous structure on the first protection layer of the measurement electrode 23. The second protection layer protects the measurement electrode 23 from sulfur, phosphorus, glass materials contained in exhaust gas.

The processes previously described makes it possible to produce the gas sensor element 2.

Experiment
(Production of Test Samples)

A description will now be given of the experiment using five types of test samples as the gas sensor element 2, and the evaluation of the five types of the test samples with reference to FIG. 4 and FIG. 5.

In the experiment, a content of thallium contained in each of the five types of the test samples was detected by the following method.

The test samples as the gas sensor element 2 were inserted into a glass container. An aqua regia solution was added into the glass container so as to immerse each of the test samples in the aqua regia solution. Each of the test samples was dissolved in the aqua regia solution at a temperature of 40° C. for one hour by using a water-bath ultrasonic cleaner. The visual inspection detected whether the measurement electrode 23 has been remained on the surface of the test sample as the gas sensor element.

When the visual inspection detects the presence of the measurement electrode on each test sample, each test sample was immersed again into the same aqua regia solution, and the aqua regia solution was heated at the same temperature for additional ten minutes until the measurement electrode was completely dissolved in the aqua regia solution. A necessary amount of ultra pure water was added into the aqua regia solution, and the inductively coupled plasma mass spectrometry (ICP-MS) analysis of the aqua regia solution was performed so as to detect a content amount of thallium in the measurement electrode in each test sample.

The ICP-MS analysis provides detection results in which the test samples had 0.1 ppm, 1 ppm, 10 ppm, 100 ppm and 200 ppm of a content of thallium in the measurement electrode.

The following explanation will refer to, as the test sample 1, a gas sensor equipped with a gas sensor element in which the measurement electrode contained 0.1 ppm of thallium. Similarly, will refer to, as the test sample 2, a gas sensor equipped with a gas sensor element in which the measurement electrode contained 1 ppm of thallium, will refer to, as the test sample 3, a gas sensor equipped with a gas sensor element in which the measurement electrode contained 10 ppm of thallium, will refer to, as the test sample 4, a gas sensor equipped with a gas sensor element in which the measurement electrode contained 100 ppm of thallium, and will refer to, as the test sample 5, a gas sensor equipped with a gas sensor element in which the measurement electrode contained 200 ppm of thallium.

In addition, the experiment produced an additional test sample 1C by using electroless platinum plating solution without thallium raw material. That is, the test sample 1C was a gas sensor equipped with a gas sensor element in which the measurement electrode did not contain thallium, i.e. thallium particles. No nothing protection layer was formed on the measurement electrode of each of the test samples 1 to 5 and 1C.

(Evaluation of Detection Response to No Gas)

The experiment performed the evaluation in a detection response of each test sample to NO gas.

Specifically, a gas sensor as each test sample was heated by the heater at a temperature of 600° C. so that an exhaust gas detection part of each test sample had a temperature of 600° C. After this, a gas at a temperature of 500° C. was supplied to each test sample. After this, the experiment detected a variation of a sensor output of each of the test samples 1 to 5 and the test sample 1C during an elapse of time counted from a time when the supply of each of three types of gases was switched. Three types of gases were a CO gas of 200 ppm as a rich gas, a CO gas of 200 ppm as a lean gas, and a mixture NO gas (defined below) of 400 ppm.

The experiment detected the response time (as a detection sensitivity to a small amount NO gas) counted from the gas-supply switching time to a time when the sensor output of each test sample was reduced below 0.45 V.

The experiment used two types of the mixture NO gas which were a mixture of CO gas (100 ppm) and NO gas (200 ppm), and a mixture of CO gas (300 ppm) and NO gas (600 ppm). The experiment used $N_2$ gas as a carrier gas. A gas concentration of these gases used in the experiment represents a volume ratio.

Figure 4:
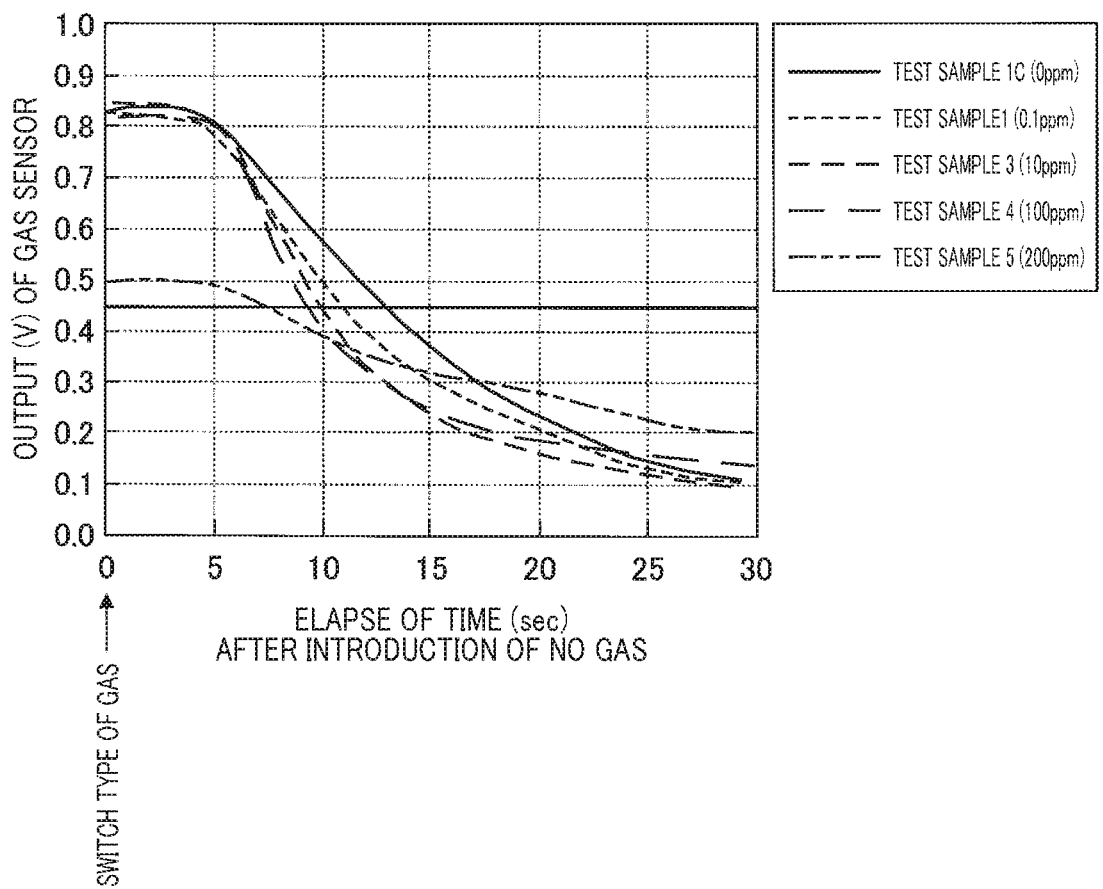
FIG. 4 is a graph showing a relationship between sensor outputs of each test sample and an elapse of time counted from a switching time of gases.
Figure 5:
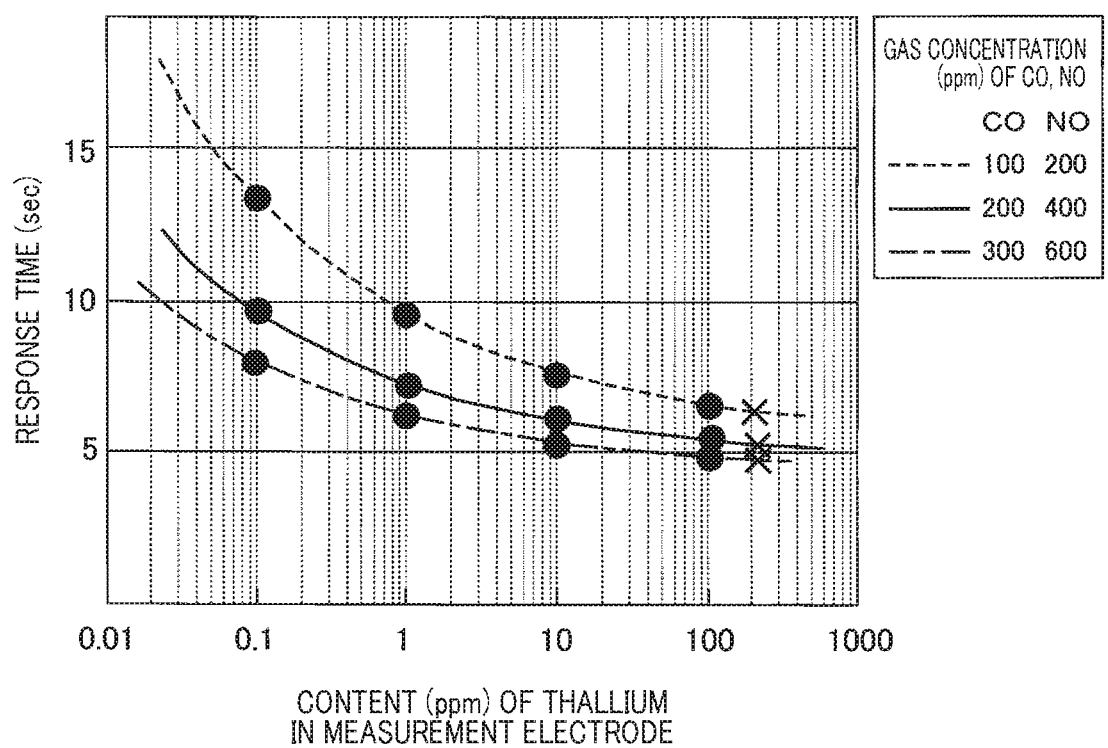
FIG. 5 is a graph showing a relationship between a response time of each test sample and a content of thallium contained in a measurement electrode of each test sample.

The evaluation results of the experiment are shown in FIG. 4 and FIG. 5. That is, FIG. 4 is a graph showing the relationship between sensor outputs of each test sample as the gas sensor and the elapse of time counted from a time when various types of gases were introduced in each test sample as the gas sensor. FIG. 5 is a graph showing the relationship between the response time (as the detection sensitivity to a small amount NO gas) and a content of thallium contained in measurement electrode of each test sample as the gas sensor.

As shown in FIG. 4, because they contain thallium, i.e. thallium particles in the measurement electrode, the test samples 1, 3, 4 and 5 as the gas sensor had a superior response time to a small amount of NO gas when compared with that of the test sample 1C containing no thallium. It is accordingly possible for the test samples 1, 3, 4 and 5 to have an improved response speed to NO gas contained in exhaust gas.

Further, as shown in FIG. 4, the response speed to a NO gas increases according to increase of the content of thallium in the measurement electrode.

When the content of thallium in the measurement electrode becomes 200 ppm, there is a tendency for the sensor output of the gas sensor to be reduced. This means that it becomes difficult for CO gas to be adsorbed on the measurement electrode according to increase of the content of thallium in the measurement electrode.

Accordingly, it is preferable for the measurement electrode to contain thallium, i.e. thallium particles of not more than 150 ppm, more preferably of not more than 100 ppm.

As shown in FIG. 5, it can be understood that it is possible to reduce, i.e. improve the response time and the response speed to NO gas according to increase of the content of thallium in the measurement electrode regardless of a concentration of CO gas and NO gas.

Incidentally, a related art detects a concentration of oxygen contained in nitrogen oxide (NOx) in exhaust gas when an internal combustion engine introduces a lean gas and emits exhaust gas contains NOx. On the other hand, exhaust gas does not contain detectable NOx gas when the engine introduces a rich gas having an excess air rate λ of not more than 1, where the excess air rate λ=(Air fuel ratio of actual mixture gas/Theoretical air fuel ratio (Stoichiometric)). That is, it is possible to detect NOx when the engine introduces a lean gas having an air fuel ratio of not less than 1. Accordingly, it is necessary to use a superior gas sensor capable of correctly detecting the stoichiometric (λ=1) of the air fuel ratio so as to correctly control the behavior of an internal combustion engine, and to avoid the detected excess air rate λ from entering a lean region. This control using the superior gas sensor makes it possible to correctly adjust the amount of NOx contained in exhaust gas.

As previously explained, it is necessary to use such a superior gas sensor having a superior detection sensitivity in order to suppress an exhaust amount of NOx (as one of environmentally regulated substances). In order to improve the NOx detection sensitivity of a gas sensor, there is a method of doping a metal element into a platinum electrode. In this structure, because the platinum electrode has a reduced adsorbing energy to a rich gas, the rich gas is quickly separated from the platinum electrode when NOx reaches the platinum electrode.

For example, a related art provides an oxygen sensor and a method of producing the oxygen sensor. The method has a platinum formation step, a doping step and a thermal treatment step. The platinum formation step forms a platinum electrode on one surface of a solid electrolyte body having oxygen ion conductivity. The doping step dopes at least a single type of metals, i.e. adhered on the surface of the platinum electrode, where, the one type of metals are selected from Group IB, group JIB, Group IIIB, Group IVB, Group VB and Group VIB in the Periodic table. The thermal treatment step performs a thermal treatment of the platinum electrode with the doped metal at a temperature within a range of 900° C. to 1500° C. under inert atmosphere. This thermal treatment step produces a measurement electrode or detection electrode.

However, because the metals Pb, Zn, and Sn used in the related art technique previously described are thermally unstable in a usage environment, it is necessary to use a large amount of these metals. This reduces an unnecessary amount of adsorbing energy on the measurement electrode of adsorbing a rich gas such as carbon monoxide, hydrocarbon such as methane, propane. In particular, when the gas sensor is arranged at a downstream side of a catalyst converter, where an exhaust gas purified by the catalyst converter has a small amount of NOx, the output of the gas sensor becomes unstable. As previously described, it is difficult for the gas sensor according to the related-art technique to reduce an amount of NOx emission in view of Automobile exhaust gas regulation.

Further, the related-art technique provides no countermeasure to increase a response speed to a small amount of NOx contained in exhaust gas.

In order to solve the related-art problem previously described, the present disclosure provides the gas sensor element having an improved structure in which the measurement electrode has thallium, i.e. thallium particles. This improved structure of the gas sensor element makes it possible to reduce rich gas adsorbing energy, and to reduce an adsorbing amount of rich gas on the measurement electrode when compared with that of an electrode made of platinum without containing any thallium. In the gas sensor according to the present disclosure, a lean gas can be adsorbed on the surface of the measurement electrode when a small amount of NOx contained in exhaust gas has reached the measurement electrode. Further, such a rich gas is oxidized and rapidly separated from the measurement electrode by an electrode catalyst reaction. Accordingly, it is possible for the present disclosure to provide the gas sensor having a superior response speed to a small amount of NOx contained in exhaust gas as a detection target.

It is preferable to arrange the gas sensor according to the present disclosure at a location of a downstream side of the catalyst converter mounted on an exhaust gas system for an internal combustion engine.

The gas sensor according to the present disclosure makes it possible to detect a small amount of NOx contained in exhaust gas with a high sensitivity. The use of the gas sensor according to the present disclosure allows a controller to perform precise control of the internal combustion engine so as to operate the catalyst converter with high effectively.

This makes it possible to further reduce the NOx emission of the internal combustion engine.

While specific embodiments of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A gas sensor comprising a gas sensor element, the gas sensor element comprising:
    a solid electrolyte body of a cylindrical cup shape, one end of which is a closed to form a bottom part, and the other end of which is open, the solid electrolyte body having oxygen ion conductivity;
    a reference electrode arranged on an interior surface of the solid electrolyte body having a cylindrical cup shape, the reference electrode being in contact with atmospheric air; and
    a measurement electrode arranged on an exterior surface of the solid electrode body, and the measurement electrode is in contact with exhaust gas as a detection target,
    wherein at least one of the measurement electrode and the reference electrode contains thallium particles having a mass ratio range of not less than 0.1 ppm and not more than 150 ppm.

2. The gas sensor according to claim 1, wherein the thallium particles contained in at least one of the measurement electrode and the reference electrode are selected from either a thallium alloy or an thallium oxide.

3. The gas sensor according to claim 1, wherein the measurement electrode is made of platinum and thallium particles.

4. The gas sensor according to claim 2, wherein the measurement electrode is made of platinum and thallium particles.

5. An exhaust gas system comprising:
    an exhaust gas pipe connected to an internal combustion engine;
    a catalyst converter mounted on the exhaust gas pipe; and
    a gas sensor configured to detect a concentration of oxygen in exhaust gas emitted from the catalyst converter, the gas sensor being mounted on the exhaust gas pipe and arranged at a downstream of the catalyst converter,
    the gas sensor comprising a gas sensor element,
    the gas sensor element comprising,
        a solid electrolyte body of a cylindrical cup shape, one end of which is a closed to form a bottom part, and the other end of which is open, the solid electrolyte body having oxygen ion conductivity;
        a reference electrode arranged on an interior surface of the solid electrolyte body having a cylindrical cup shape, the reference electrode being in contact with atmospheric air; and
        a measurement electrode arranged on an exterior surface of the solid electrode body, and the measurement electrode is in contact with exhaust gas as a detection target,
    wherein at least one of the measurement electrode and the reference electrode contains thallium particles having a mass ration content provided in a range of not less than 0.1 ppm and not more than 150 ppm.

6. The exhaust gas system according to claim 5, wherein the measurement electrode is made of platinum and thallium particles.

7. The exhaust gas system according to claim 5, wherein the thallium particles contained in at least one of the measurement electrode and the reference electrode are selected from either a thallium alloy or a thallium oxide.

* * * * *